(12) United States Patent
Vion

(10) Patent No.: US 7,175,768 B2
(45) Date of Patent: Feb. 13, 2007

(54) METHOD AND DEVICE FOR CLARIFICATION OF LIQUIDS, PARTICULARLY WATER, LOADED WITH MATERIAL IN SUSPENSION

(75) Inventor: Patrick Vion, Houilles (FR)

(73) Assignee: Degremont, Rueil-Malmaison (FR)

( * ) Notice: Subject to any disclaimer, the term of this patent is extended or adjusted under 35 U.S.C. 154(b) by 150 days.

(21) Appl. No.: 10/505,676

(22) PCT Filed: Mar. 6, 2003

(86) PCT No.: PCT/FR03/00725

§ 371 (c)(1),
(2), (4) Date: Mar. 14, 2005

(87) PCT Pub. No.: WO03/076343

PCT Pub. Date: Sep. 18, 2003

(65) Prior Publication Data

US 2005/0150840 A1 Jul. 14, 2005

(30) Foreign Application Priority Data

Mar. 12, 2002 (FR) .................................. 02 03066

(51) Int. Cl.
C02F 9/02 (2006.01)
C02F 9/04 (2006.01)
C02F 1/24 (2006.01)
C02F 1/52 (2006.01)

(52) U.S. Cl. .................. 210/703; 210/738; 210/803; 210/804; 210/202; 210/205; 210/221.2; 210/534

(58) Field of Classification Search ................ 210/703, 210/738, 803, 804, 202, 205, 221.2, 534
See application file for complete search history.

(56) References Cited

U.S. PATENT DOCUMENTS

| | | | | |
|---|---|---|---|---|
| 3,932,282 A | * | 1/1976 | Ettelt | 210/195.1 |
| 4,470,903 A | * | 9/1984 | van Leeuwen | 209/168 |
| 4,957,633 A | * | 9/1990 | Suutarinen | 210/705 |
| 5,169,004 A | | 12/1992 | Pos | |
| 5,382,369 A | * | 1/1995 | Vion | 210/726 |
| 5,516,433 A | * | 5/1996 | Suutarinen | 210/703 |
| 5,900,154 A | | 5/1999 | Henriksen | |
| 6,174,434 B1 | | 1/2001 | Krofta | |

FOREIGN PATENT DOCUMENTS

| | | |
|---|---|---|
| EP | 0 267 328 | 5/1988 |
| WO | WO-01 60494 A | 8/2001 |

* cited by examiner

Primary Examiner—Thomas M. Lithgow
(74) Attorney, Agent, or Firm—Connolly Bove Lodge & Hutz LLP

(57) ABSTRACT

A method is disclosed for clarifying, by flotation, waters contaminated with suspended matter, wherein the clarification treatment takes place in two successive steps implemented in a single installation. The method principally involves flowing contaminated water through a downflow static flocculation step and then down through a lamellar settler separation step positioned directly below the downflow static flocculation step, the settling rates of the heavier particles of the lamellar settler separation step removing heavier particles from the water retained during the static flocculation/lamellar separation step being less than or equal to the settling rates of the floatable particles. The water which has passed through the static flocculation/lamellar settler separation step is then subjected to a flotation step which removes the light particles in the water of which the settling rate is lower than a flotation cutoff threshold.

6 Claims, 2 Drawing Sheets

METHOD AND DEVICE FOR CLARIFICATION OF LIQUIDS, PARTICULARLY WATER, LOADED WITH MATERIAL IN SUSPENSION

FIELD OF THE INVENTION

The present invention relates to improvements made to methods, in particular physicochemical, for clarifying, by flotation, waters containing suspended matter.

BACKGROUND OF THE INVENTION

Flotation is a clarification technology (solid-liquid separation) which offers an alternative to settling, at least for certain types of water.

According to this known technology (see in particular "Memento Technique de l'Eau" 1989, Volume 1, pages 171 et seq.), after a coagulation-flocculation step, the water is mixed with a "milk" (that is, an emulsion) of microbubbles, generally of air, the average diameter of which is between 40 and 80 microns. These microbubbles stick to the flocs which, thereby lightened, tend to rise to the surface of the flotation cell, where they accumulate to form a sludge layer or bed. The sludges are collected at the surface of the flotation unit, while the clarified water is removed via the bottom of the apparatus.

A portion of this water is pumped (delivery generally between 5 and 15% of the water flow rate to be treated by clarification), at a pressure of about $4 \times 10^5$ to $6 \times 10^5$ Pa into a specific tank, called pressurization tank, in which the air is dissolved in large amounts, that is, up to five times the maximum concentration of air in water at atmospheric pressure. During a sudden expansion to atmospheric pressure, the air is placed in a condition of supersaturation and generates microbubbles. The expansion systems are placed in a specific zone in which the microbubbles are mixed with the flocculated water.

To be physically separated from the water in a settler, a floc must be dense and large sized. On the contrary, to be separated by flotation, it suffices for said floc to be properly formed: it can be light and small sized. Flocculation can therefore be simplified, hence the virtually general absence of use of polymer for the flotation treatment of relatively uncontaminated waters, and the use of smaller reactors than in the case of settling units situated downstream of a diffuse flocculation (as opposed to the sludge bed or "ballasted" settlers).

The weak point of flotation is that the microbubbles stick with difficulty to the mineral particles and cannot guarantee that the heavy particles present in the water will rise to the surface. Accordingly, the applications of flotation are often limited to the clarification of relatively uncontaminated waters, particularly lake waters, wells, seawater and specific industrial effluents or wash waters from biological filters.

The other features and advantages of flotation include the following in particular:
 the pressurization system is very simple and it is very rapidly ramped up to operating regime. Flotation units start nearly instantaneously: they are very simple units to operate, even in intermittent operation;
 the sludges extracted are concentrated: up to 10 to 40 g/l, if they are scraped;
 the microbubbles have upflow velocities of 6 to 12 m/h, which results in clarification rates conventionally limited between 4 and 10 m/h.

Despite their advantages, flotation units have hardly been able to compete with the generation of high-speed lamellar settlers, with sludge bed or ballast, particularly for the following reasons:
 generally oversized volume of the flocculation zone;
 relatively low separation rates;
 pressurization energy cost and
 relatively limited field of application.

However, high-speed flotation units have appeared in recent years, thanks to the use of countercurrent lamellar modules or specific retrieval systems (EP 0 659 690). According to these new techniques, clarification rates in the range of 20 to 40 m/h can be obtained. Moreover, flocculation studies have shown that static or hydraulic flocculators (equipped with a series of deflectors and baffles), by achieving a plug-flocculation, help to halve the time required for flocculation by stirrer, for example, in certain cases, from ten minutes to five minutes. FIG. 1 of the drawings appended hereto shows an embodiment of a flotation unit employing this technique. In this figure, the numeral 10 designates the coagulator, the numeral 11 the flocculator comprising a series of deflectors and baffles, and the numeral 12 the flotation cell. The pressurization tank is designated by the numerals 13. The suspended matter accumulating at the surface of the flotation cell is removed by a surface scraper system 14 and a sludge discharge at 15, the clarified water being removed at 24.

In such a known installation, which offers short flocculation times and high rates in the flotation unit 12, flotation can become extremely competitive with settling: today, the aim of a person skilled in the art is to design flotation units in which the flocculation time is about 5 minutes, with separation rates of 30 to 40 m$^3$/m$^2$·h.

Flotation technology is accordingly making a strong comeback in connection with the clarification of low-contaminated waters, given the competitive costs of this technology compared with settling, and also because of its obvious simplicity of operation.

By contrast, the major drawback of flotation is that this technique cannot extend its field of application to the vast field of river waters, wastewaters (primary, rainfall, etc.), wash waters, etc. due to the difficulty, indeed the impossibility, of "floating" dense and/or large-sized particles. Attempts have nonetheless been made to design flotation units which can operate on these difficult waters. However, the results obtained are very mediocre, both in terms of operating cost and treatment quality. This entails the need to use stirring systems such as propellers to prevent deposits in the flocculators and to provide a bottom scraper system in the flotation cell. FIG. 2 in the drawings appended hereto shows an embodiment of this type of installation. It shows at 16 the propellers positioned in the flocculator 11 and at 17 the scraper placed at the bottom of the flotation cell 12. The major drawback of this type of flocculation by mechanical stirring is that it imposes bulky flocculators and "inflates" the residence times of the effluent to be treated in the installation.

Furthermore, the settling of heavy flocs at the bottom of the flotation cell 12 (where the outlet of the treated effluent is located) and their re-placement in suspension during the passage of the scraper 17 produces a mediocre quality clarified water.

BRIEF DESCRIPTION OF THE INVENTION

Starting with the prior art mentioned above, the present invention proposes to solve the technical problem consisting in using flotation to treat waters containing not only floatable particles, but also heavy and unfloatable particles, while maintaining an optimal quality of the clarified water, preserving the compactness of the hydraulic or static flocculation zone, and guaranteeing a flotation unit free of bottom sludges.

This technical problem is resolved by a method for clarifying, by flotation, waters contaminated with suspended matter, characterized in that the clarification treatment takes place in two successive steps implemented in a single installation:

a downflow static flocculation step, which incorporates a primary separation step of the heavier particles, the zone in which the primary separation step of the heavier particles is carried out being situated under the zone in which the static flocculation step is implemented, and comprising a removal of the heavier particles and a flotation step which removes the light particles of which the settling rate is lower than the flotation cutoff threshold.

The invention also relates to a device for implementing the method as specified above, this device being characterized in that it comprises in the same enclosed space: a static flocculator equipped with deflectors and baffles, a lamellar settler positioned immediately below the static flocculator, the heavier particles issuing from the primary settling being removed at the bottom portion of the flocculator/settler, and a flotation unit with its pressurization-expansion system generating the microbubbles necessary for the flotation of the lighter particles.

As may be understood, the basic idea of the present invention is to achieve the final flocculation step in the form of a downflow static flocculation zone, to provide below this a primary separation equipped with a removal of the heavier particles, the whole being positioned upstream of the actual flotation zone: under these conditions, the flotation cell only operates on the light particles, which it easily removes.

Other features and advantages of the present invention will appear from the description given below, with reference to the drawings appended hereto, which illustrate non-limiting embodiments.

DETAILED DESCRIPTION OF THE INVENTION

Figure 1:
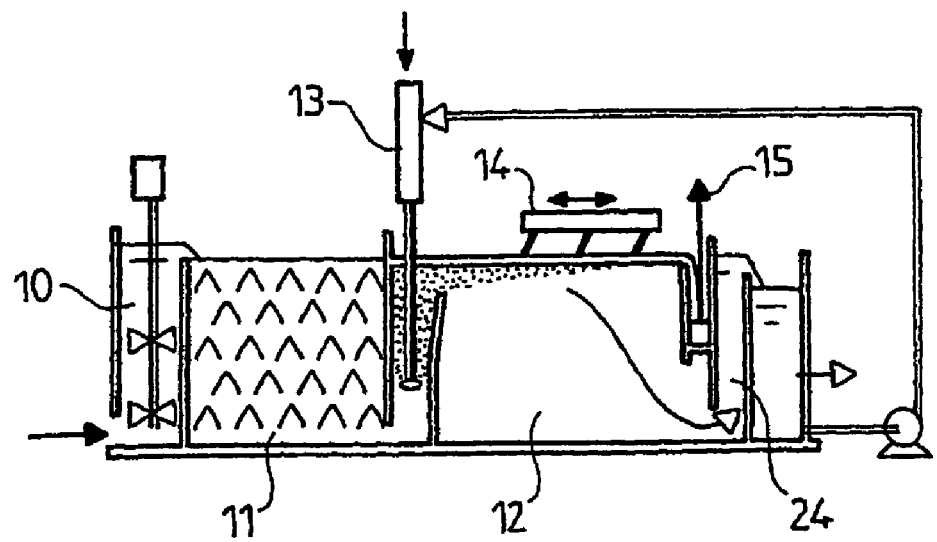
FIG. 1 is a diagrammatic view of a first flocculator of the prior art.
Figure 2:
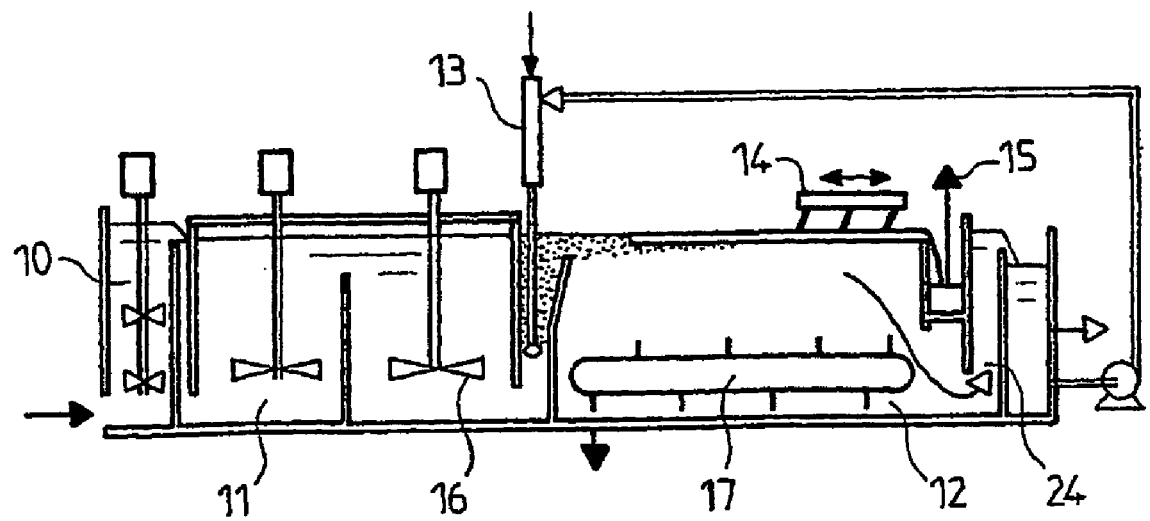
FIG. 2 is a second flocculator of the prior art.

FIG. 1 shows the flocculator 11 and the flotation unit 12 with its surface scraper 14. According to the invention, a static flocculator with deflectors 18, under which a lamellar settling module 19 is placed, is positioned upstream of the flotation unit 12. The combination of the flocculator 18 and the lamellar settling module 19 constitutes the zone of downflow static flocculation—primary separation of heavier particles, said particles being removed at 20 in the bottom portion of this zone.

Thanks to this arrangement, the invention can be used to treat most types of waters, including those containing particles that are too light to settle and too heavy to float.

The lamellar settling module stage 19 situated under the baffles or deflectors of the static flocculator 18, in addition to the settling of the heavier particles, performs two supplementary functions:

by increasing the number of deposition surfaces, it serves to retain particles of which the settling rate is 5 to 20 times lower than the rate across the flotation cell. The settling rate of the smallest particles retained defines what is referred to as the settler cutoff threshold;

by creating an essentially laminar flow regime within the lamellar modules, which offers the lightest and most fragile particles a final flocculation step at very low energy, where they can finally "mature" and be structured.

Figure 3:
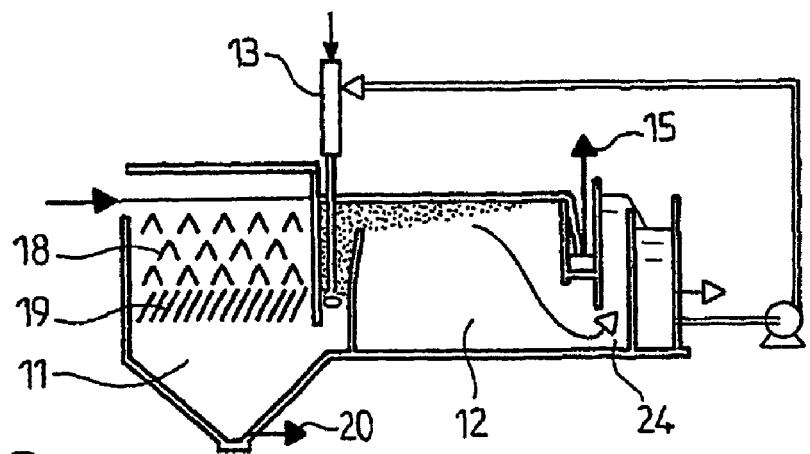
FIGS. 3 to 5 show a vertical cross sections of embodiments of a clarification installation putting into practice the method of the invention.
Figure 4:
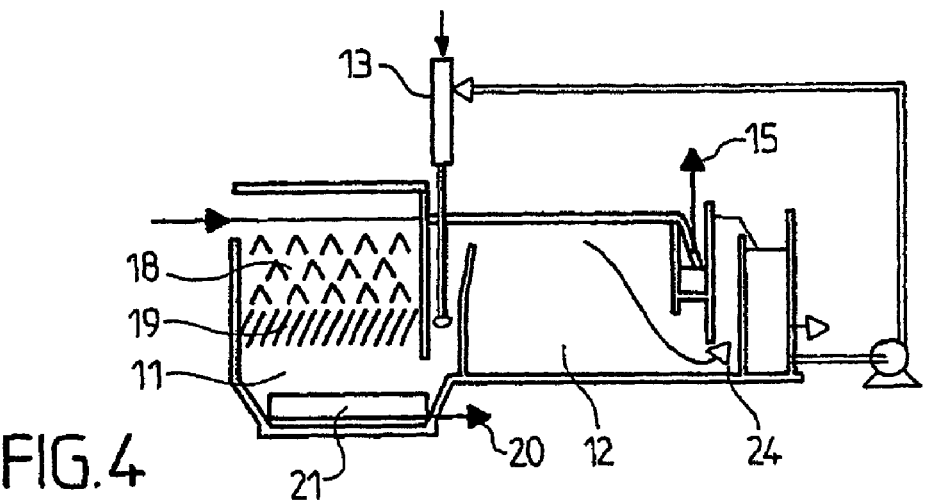

The heavier particles deposit inside the tubes or plates of the lamellar settling modules 19. These modules make an angle to the horizontal that is greater than the angle of repose of the particles, that is, that deposited on these modules, said particles gradually slide downward. During this movement, these particles or flocs tend to roll and aggregate with other particles. In the bottom portion of the lamellar settling module 19, they are hence larger, denser, and their own settling rate is considerably higher. Under these conditions, at the outlet of the lamellar settling module, they easily pass through the hydraulic flux and reach the bottom of the flocculator/settler where they accumulate before being removed at 20. In the embodiment shown in FIG. 3, this removal is effected by gravity, whereas in the embodiment in FIG. 4 (which is identical to the embodiment in FIG. 3), this removal is achieved by a scraper system 21.

The hydraulic flux that is then sent to the flotation cell 12 is therefore stripped of the heavier particles which have been retained by the lamellar settling module 19, and it now only contains light particles which have been structured for the flotation through the static flocculation steps (at 18) and laminar flocculation (at 19).

The flocculation can be a reagent-free mechanical flocculation, that is, that the floc is formed and grows under the simple effect of the turbulence of stirring, which can be caused by static devices (baffles, deflectors) or mechanical devices (propellers, stirrers). This is the case, for example, with biological flocs.

However, flocculation is usually a physicochemical phenomenom. It comprises a first coagulation step in which microparticles (colloids) are destabilized (their Zeta potential is neutralized) by the addition of a metallic salt ($Fe^{+++}$ or $Al^{+++}$), which enables them to aggregate and grow in the second so-called flocculation step, to form light flocs.

In general, this step suffices for flotation. To form denser, larger flocs, fit for settling, a polymer is injected at the head end of the flocculation unit.

Figure 5:
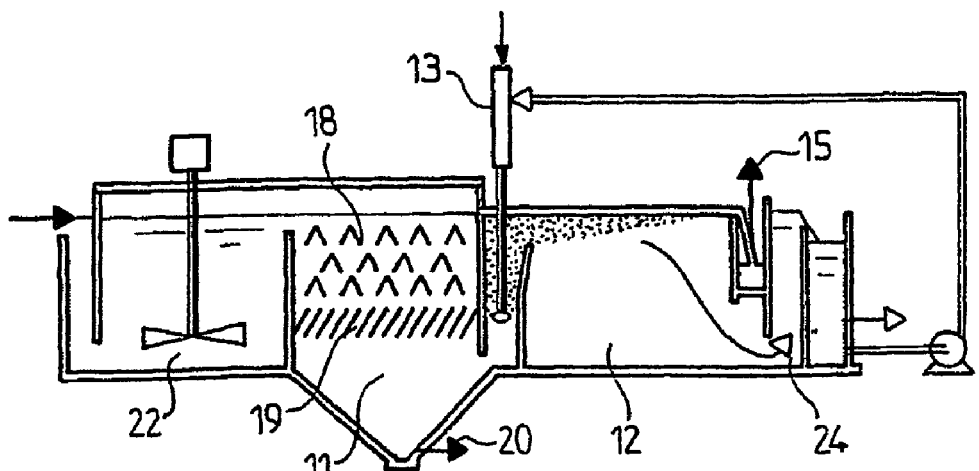

In the embodiment shown in FIG. 5, the installation implementing the method according to the invention comprises an additional mechanical flocculation cell 22 maintained with stirring, into which flocculant (polymer) can be injected, this cell 22 being positioned upstream of the static flocculator 18-settler 19.

In order for the method to be completely effective, that is, for it to eliminate 100% of the suspended matter, the settling rate of the particles retained in the flocculator-settler (rate which corresponds to the settler cutoff threshold) must be less than or equal to the settling rate of the floatable particles.

To illustrate this feature, a number of examples are given below:

1. If the flocculator 18-settler 19 retains the particles having rates above 10 m/h (settler cutoff threshold) and if the flotation unit 12 can only "float" particles of which the settling rate is lower than 5 m/h, the particles with settling rates between 5 and 10 m/h will pass through both the flocculator-lamellar settler and the flotation unit, and finally pollute the clarified water.

2. If, on the contrary, the flocculator-settler retains the particles having rates higher than 4 m/h and if the flotation unit can float the particles of which the settling rate is lower than 5 m/h, then the entire installation (flocculator-settler+flotation unit) will have retained 100% of the particles.

3. If the flocculator-settler retains the particles having rates above 1 m/h and if the flotation unit can float particles of which the settling rate is lower than 10 m/h, it is again evident that the installation will have retained 100% of the particles, but this evidently implies that this device is oversized or that the reagents are overdosed.

Based on a reasonable dimensioning of the installation, it therefore appears that the installation can be run, according to the invention, in order to cover the treatment of all types of water, by adjusting the respective doses of coagulant and flocculant (polymer).

As to the three cases examined in the above examples, the following remarks are in order:

1. In the first case, many alternatives are available to improve operations: it is first possible, by increasing the doses of coagulant, to alter the structure of the heavier particles or flocs leaving the flocculator-settler, so that they can float despite settling rates of 10 m/h. It is also possible to place a more efficient lamellar settling module on the flocculator side, to have a cutoff threshold lower than 5 m/h (for example, by adopting a smaller diameter or a greater length for the tubes making up the module, which increases the deposition surface area). It is obviously simpler to increase the dose of polymer, so that all the flocs or particles that are not likely to float have a settling rate above 10 m/h.

2. In the second case, it is considered that the reagent doses and the dimensioning are suitable.

3. In the third case, it is clear that overdosing has occurred. Either the flocculant (polymer) must be reduced or removed, or the coagulant dose must be reduced: the choice depends on the treatment system. It is often more advantageous economically to reduce the coagulant. Yet reducing the polymer limits the clogging power of the water, a factor that is particularly critical if the unit is followed by a filter or treatment on membrane.

It appears from the above remarks that the invention is able to treat virtually all types of water and easily optimize the dosing of the reagents.

An embodiment of the method according to the invention will now be described. This example refers to tests that were performed on a relatively highly contaminated river water, which could not be treated directly by the conventional flotation technique.

The raw water treated had the following properties:
temperature between 5 and 7° C.;
suspended matter: 60 to 195 g/m$^3$;
turbidity 37 to 110 NTU.

A 30 m$^3$/h pilot plant of the type shown in FIG. 5 was used, that is, comprising the following main features:
a mixer with strong mechanical stirrer, into which the coagulant is injected;
a mechanical flocculation stage by stirrer 22 into which the polymer or flocculant is injected;

a static flocculation stage 18 presenting a residence time of 4 minutes and a cross section of 0.8 m$^2$, and comprising from the top downward three series of baffles, under which is arranged a lamellar settler 19 and a hopper 23 to recover the settled particles or flocs. This lamellar module is formed of hexagonal-section ducts 50 mm in height and 750 mm long. It develops an active surface area of 8.7 m$^2$ per m$^2$ installed, which means that the rate of the smallest particles retained by this settler can be divided by 8.7 (cf. Hazen's law). The apparent rate in the flocculator can only retain particles settling at more than 37.5 m/h (30 m$^3$/h/0.8 m$^2$). Thanks to the lamellar settling module 19, it is possible to retain particles settling at 37.5/8.7=4.3 m/h or more (cutoff threshold of the lamellar settling module);

the actual flotation cell 12 presenting a cross-sectional area of 1 m$^2$. The apparent rate on this section is hence 30 m/h.

Furthermore, this pilot plant was equipped with a pressurization-expansion system, designated by the numeral 13, generating microbubbles smaller than 100 μm in diameter, which are mixed with the flocculated water entering the flotation cell 12.

For different reagent doses, the results obtained on this pilot plant are as follows:

1. Coagulant=25 g/m$^3$ and polymer=0.2 g/m$^3$ Treated water:
Turbidity=0.6 to 1.1 NTU
Suspended matter=0.9 to 2 g/m$^3$ 2. Coagulant=25 g/m$^3$ and polymer=0 g/m$^3$ Treated water:
Turbidity=2 to 4 NTU
Suspended matter=5 to 9.8 g/m$^3$ 3. Coagulant=50 g/m$^3$ and polymer=0 g/m$^3$ Treated water:
Turbidity=1 to 1.9 NTU
Suspended matter=2.5 to 4.2 g/m$^3$ 4. Coagulant=50 g/m$^3$ and polymer=0.2 g/m$^3$ Treated water:
Turbidity=0.4 to 0.9 NTU
Suspended matter=0.9 to 1.8 g/m$^3$ In conclusion, the practical results obtained on this pilot plant serve to confirm that:

the method according to the invention serves to obtain a suspended matter removal efficiency higher than 90%, even on relatively highly contaminated waters;

the adjustment of the respective doses of coagulant and flocculant serves to adjust the respective performance of the flocculator-settler and of the flotation unit;

the results of test No. 4 are the most satisfactory in absolute value, but at the cost of high coagulant consumption (overdose). The best operating conditions are those of test No. 1;

at least in the case of the properties of raw water mentioned above, it is confirmed that the absence or insufficiency of flocculant does not enable the flocculator-settler to suitably retain the heavy particles.

Without going beyond the framework of the present invention, a number of variants of putting into practice and/or embodiments can be considered.

Thus, in all cases in which physicochemical coagulation is necessary, the flocculation cell can be preceded by a high energy mixing zone to mix the coagulant (reactor with stirrer, high pressure drop upflow static reactor, in-line mixer, weir, etc). The flocculant (polymer), if necessary, is injected at the outlet of the mixing zone or in the first stirred flocculator. This variant corresponds to FIG. 5 examined above.

Depending on the size of the flocculation-settling cell, the bottom sludges are removed either through a hopper 23

(FIGS. 3 and 5), or by means of a scraper 24 (FIG. 4), or by any other sludge extraction system known to a person skilled in the art.

If imposed by the residence time, the static flocculation cell can be preceded by one or more flocculation stages with stirrer. These cells are stirred to prevent deposition.

When an effluent to be treated presents a high suspended matter content, the efficiency of the flotation unit is limited by the mass flow to be removed (kg/m$^2$). The treatment rate is then reduced in proportion to said mass flow.

It can be understood from the preceding description that the method according to the invention serves to remove a portion of the load of suspended matter in the flocculator-settler, by increasing the dose of flocculant (polymer). The mass flow on the flotation unit is also significantly reduced, making it possible to operate at high speed and perform a finishing role. Thus, thanks to the invention which consists in combining two treatment steps, flocculation-settling and flotation, any particle in suspension, not retained in the flocculator-settler, has a settling rate lower than the flotation rate, making it possible to remove it during the flotation step.

The method as described goes against the tendency of the prejudices of a person skilled in the art who, whenever a question of flotation arises, tries to use reagents that can lighten the floc whereas, on the contrary, the invention seeks to densify the heavy particles, in particular.

Moreover, in order to obtain the maximum compactness of the installation, and again in opposition to the tendency of a person skilled in the art, the invention puts into practice a lamellar settling system, designed only to be partially effective (these systems are normally used for fine separation) and uses the flotation stage as a finishing step.

It naturally remains true that the present invention is not limited to the embodiments described and shown above, but that it encompasses all its variants. Thus the device according to the invention can comprise, upstream of the flocculator-settler, a mixer or an in-line injection means which can be provided, for example, on the weir supplying this flocculator-settler.

The invention claimed is:

1. A method for clarifying, by flotation, waters contaminated with suspended matter, wherein the clarification treatment takes place in two successive steps implemented in a single installation:

flowing contaminated water through a downflow static flocculation step, and then down through a lamellar settler separation step positioned directly below the downflow static flocculation step;

the lamellar settler separation step removes heavier particles from the water;

the settling rates of the heavier particles retained during this static flocculation/lamellar separation step being less than or equal to the settling rates of floatable particles in the water and subjecting the water, which has passed through the static flocculation/lamellar settler separation step to;

a flotation step which removes the light particles of which the settling rate is lower than the flotation cutoff threshold.

2. The method as claimed in claim 1, wherein the flocculation step is preceded by a high energy mixing step for the introduction of one or more reagents.

3. The method as claimed in claim 1, wherein the static flocculation step is preceded by one or more flocculation steps with stirring.

4. A device for implementing the method as claimed in claim 1, comprising in the same enclosed space: a static flocculator equipped with deflectors and baffles, a lamellar settler positioned immediately below the static flocculator, the heavier particles issuing from the primary settling being removed at the bottom portion of the flocculator/settler, and a flotation unit positioned to receive the water which has flowed through the flocculator/settler and has had heavier particles removed therefrom, the flotation unit having a; pressurization-expansion system generating the microbubbles necessary for the flotation of the lighter particles from the water.

5. The device as claimed in claim 4, comprising it further comprises one or more mechanical flocculation cells maintained with stirring, into which flocculant is injected, said cell being inserted between a coagulator and the static flocculator-lamellar settler.

6. The device as claimed in claim 4, further comprising, it comprises, upstream of the flocculator-settler, a mixer or an in-line injection means which can be positioned on their weir supplying the flocculator-settler.

* * * * *